Oct. 7, 1958           L. C. WATERMAN           2,855,360
APPARATUS FOR ELECTRICALLY TREATING EMULSIONS
Filed Feb. 26, 1954           2 Sheets-Sheet 1
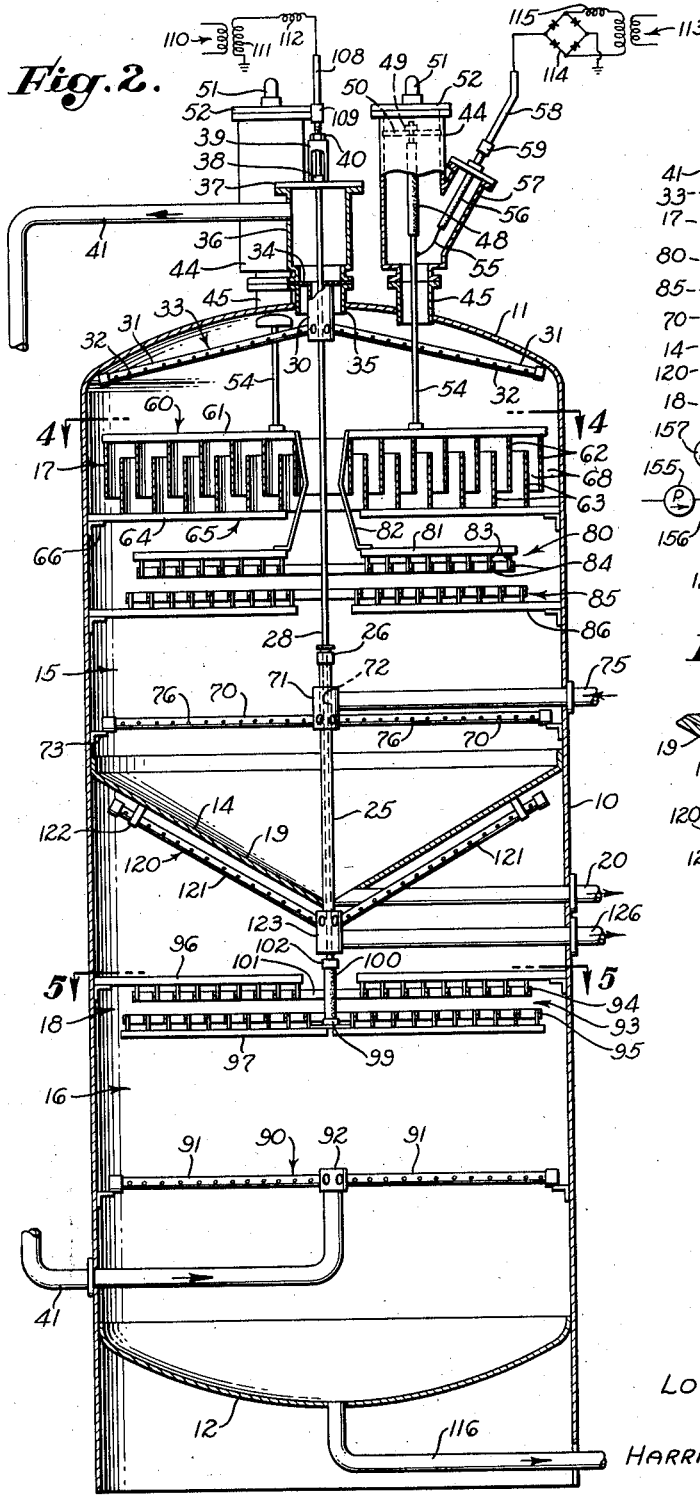
INVENTOR.
LOGAN C. WATERMAN
BY HIS ATTORNEYS.
HARRIS, KIECH, FOSTER & HARRIS Oct. 7, 1958      L. C. WATERMAN      2,855,360
APPARATUS FOR ELECTRICALLY TREATING EMULSIONS
Filed Feb. 26, 1954      2 Sheets-Sheet 2

INVENTOR.
LOGAN C. WATERMAN
BY HIS ATTORNEYS.
HARRIS, KIECH, FOSTER & HARRIS

United States Patent Office 2,855,360
Patented Oct. 7, 1958

2,855,360

APPARATUS FOR ELECTRICALLY TREATING EMULSIONS

Logan C. Waterman, Houston, Tex., assignor to Petrolite Corporation, Wilmington, Del., a corporation of Delaware Application February 26, 1954, Serial No. 412,786

16 Claims. (Cl. 204—304)

My invention relates to the electric treatment of oil-continuous mixtures of liquids, such as dispersions or emulsions in which minute relatively insoluble particles are dispersed in a continuous phase, the process and apparatus being designed to remove the minute particles either in an existing or modified state. In particular, the invention relates to a novel electric treater for the dual treatment of such oil-continuous liquids.

It is known that the minute particles of many oil-continuous dispersions or emulsions can be coalesced into masses of sufficient size to gravitate from the oil if the dispersion or emulsion is subjected to the action of a high-voltage electric field. The coalesced masses can be gravitationally separated, leaving a treated oil containing only a small fraction of the dispersed-phase material originally present. Such electric treatment has been applied to numerous oil-continuous mixtures, being widely practiced in the dehydration of crude oil emulsions, the desalting of refinery charging stocks, the chemical purification of certain distillates, etc.

In certain instances, it is desirable to subject the oil-continuous liquid to a dual electric treatment in which the liquid or at least some component thereof is sequentially subjected to the action of two electric fields, usually with some intervening treatment of the liquid. Infrequently, it may be desirable to subject a treated effluent from the first electric treatment, e. g., the treated oil issuing from the field or settling zone, to a second electric treatment without intervening process steps. More commonly, however, it is desirable to process additionally the treated oil from the first electric treating stage before it is subjected to a second stage treatment. For example, it may be desirable to mix water with the treated oil from the first stage to form a dispersion or an emulsion which is resolved in the second stage treatment.

It is an object of the invention to provide a unitary electric treater capable of dual electric treatment of an oil-continuous liquid. Heretofore, attempts to retreat the effluent from an electric treater have contemplated using a second and separate electric treater. It is an important object of the present invention to combine two electric treating units in a unique way; also to minimize the time between sequential electric treatments and to effect savings in construction and operating costs. A further object is to effect savings in heat by avoiding separate vessels; also to provide a dual treater in which controls and electrical equipment and connections are simplified.

A further object of the invention is to provide an electric treater in which the treating units are superimposed. This makes possible the use of a relatively tall and narrow container or vessel and results in many advantages. Among these is the advantage that large throughput vessels of such shape may be transported by rail or truck, eliminating the previously encountered problem of fabrication at the site. Additionally, such a treater occupies a much smaller floor area than two side-by-side conventional treaters. The savings in this respect are very pronounced, keeping in mind the high cost of buildings and land in refinery installations where the present invention is often used. Nor is the saving in proportion to the floor areas alone because any electric treater requires a floor area substantially larger than its container, this excess area being necessary to accommodate piping, controls, auxiliary equipment, etc. By use of the present invention two treating units will usually require no more floor area than a single treater of conventional design.

It is a further object of the invention to provide an electric treater having a cylindrical container of a length much greater than its width, there being a partition dividing the interior thereof into adjacent chambers, exemplified as upper and lower chambers. Such a construction has many advantages, permitting desirable heat transfer between the chambers, effecting savings in cost of heat insulation, and simplifying piping, electrical design, controls, etc.

A further object of the invention is to employ novel structural arrangements near the partition as concerns support and positioning of electrodes, influent or effluent pipe means, etc.

A further object of the invention is to provide novel systems for electrically insulating an electrode from its container; also to provide a novel arrangement of electrodes particularly applicable to the treatment of oil-continuous liquids by use of high-voltage unidirectional electric fields.

Further objects and advantages of the invention will be evident to those skilled in the art from the following description of an exemplary embodiment.

Referring particularly to the drawings:

Fig. 1 is a diagrammatic view illustrating one embodiment of the invention and the piping for practicing one type of process;

Fig. 2 is a vertical sectional view of the electric treater exemplified in Fig. 1;

Fig. 3 is an enlarged detail of the support for the lower electrode set shown in Fig. 2.

Figure 4:
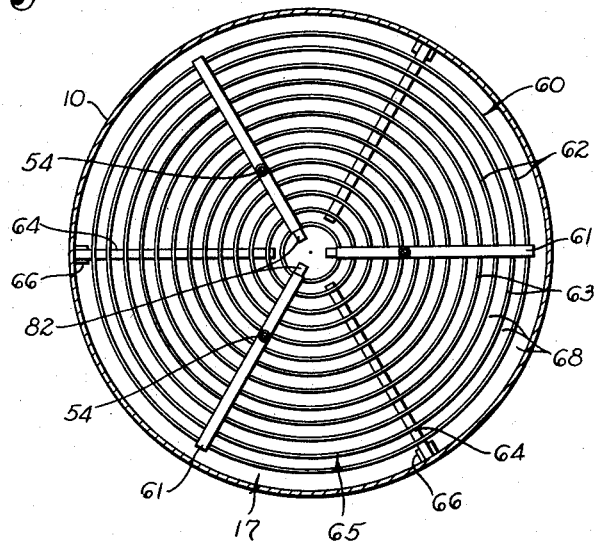
Figs. 4 and 5 are horizontal cross-sectional views taken along respectively-numbered lines of Fig. 2.
Figure 5:
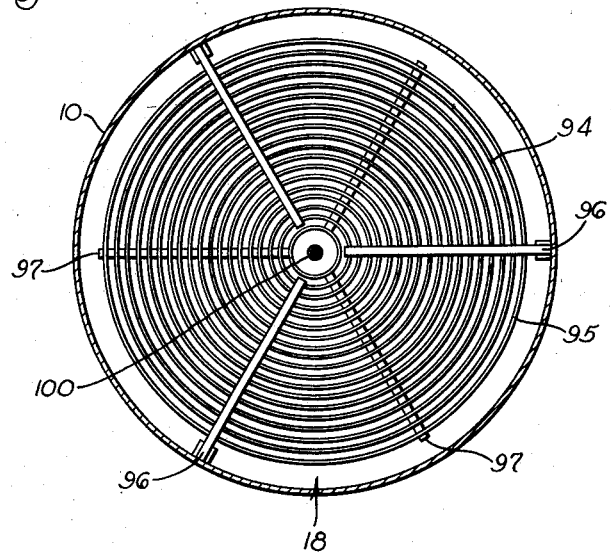

Referring particularly to Fig. 2, the treater includes an upright container 10, preferably cylindrical, much greater in height than width. Upper and lower heads 11 and 12 respectively close the upper and lower ends of the container. A metal partition 14 divides the interior of the container into upper and lower chambers 15 and 16 which, in the embodiment shown, communicate with each other only through exterior piping. Upper and lower electrode sets 17 and 18 are positioned respectively in these chambers, the latter being respectively equipped with ingress and egress pipe means for conducting liquid thereto and therefrom, as will be described.

The partition 14 is of a dished, preferably conical, shape, having a surface 19 sloping steeply downward toward an apex so that any semi-solid substance gravitating thereto will flow therealong to a pipe 20 forming a part of the egress pipe means of the upper chamber 15. This pipe 20 traverses an upper peripheral portion of the lower chamber 16 and is preferably equipped with a back pressure valve 21, see Fig. 1.

The partition 14 includes an opening 23 (Fig. 3) through which extends an upstanding pipe 25 carrying at its upper end a gland structure 26. An electrode hanger 28, preferably a long length of pipe supported at its upper end as will be described, extends downwardly axially of the container 10 and through the gland structure 26 to slide therein in substantially fluid-tight relationship.

Near its upper end, the hanger 28 extends through a manifold 30 connected internally with upwardly inclined pipes 31 containing perforations 32 preferably facing sidewardly as shown. The pipes 31 and the manifold 30 form an egress pipe means for the uppermost end of the chamber 15, constituting a collector 33 formed of a network of perforated pipes through which treated oil may be withdrawn. The manifold has at its upper end a web 34 clamped between the respective flanges of a nipple 35 and a housing 36, the latter being closed by a top plate 37 carrying a gland 38 through which the upper portion of the hanger 28 slidably extends. The extreme upper end of the hanger 28 is threaded and extends through a support member 39, the hanger 28 being supported by a nut 40 threaded thereto. By turning the nut 40 the vertical position of the hanger 28 can be changed. Treated oil entering the pipes 31 moves to the manifold 30 and thence into the interior of the housing 36 from which it flows through a pipe 41.

Three equally spaced housings 44 are supported by respective nipples 45 from the upper head 11 and carry stick insulators 48 each adjustably supported by a nut 49 from a spider 50, the nut being engageable by removing a plug 51 from a plate 52 closing the upper end of each housing 44. Hanging from the bottom of each stick insulator 48 is a hanger 54, one of these hangers being connected to a conductor 55 extending through a bushing 56 exposed in an angled portion 57 of one of the housings 44 and extending through a plate closing the end of this angled portion. The upper end of the conductor 55 is electrically joined through the conductor of the bushing 56 to a high-voltage cable 58 by means of a connector 59.

The upper set of electrodes 17 includes an upper electrode 60 comprising a foraminous frame 61 connected to the lower ends of the hangers 54 and supported thereby. Depending from the frame 61 are concentric cylindrical electrodes 62 spaced to define therebetween annular open-ended passages which are substantially bisected by concentric cylindrical electrodes 63 supported by a foraminous frame 64, the electrodes 63 and the frame 64 constituting a part of a lower electrode 65. The frame 64 is shown as supported from the container through brackets 66, representing a preferred structure in instances in which the lower electrode 65 is to be electrically connected to the container 10.

It will be recognized that the concentric cylindrical electrodes 62 and 63 are nested and interspaced so that the overlapping portions thereof define a plurality of open-ended treating spaces 68. The outermost of such treating spaces 68 is between the outermost electrode 62 and the container 10. These treating spaces occupy substantially the entire volume of a horizontal zone of the container and are preferably of equal width. When a high-voltage is applied to the upper electrode 60, electric fields of substantially uniform voltage gradient will be established in each of the treating spaces.

It is desirable that the oil-continuous liquid should be introduced into the upper chamber 15 in such manner as to produce a rising column or container-filling stream in which the upward component of velocity is substantially equal at all radial positions measured from the axis of the container. To accompish this, the ingress pipe means for the upper chamber 15 preferably comprises a network of pipes 70 radiating from a manifold 71 of the double-walled type suggested in Fig. 3, this manifold having a central passage 72 through which extends the upstanding pipe 25. If desired, the manifold 71 may be supported by the upstanding pipe 25 and the ends of the perforated pipes 70 may be supported by brackets 73. A pipe 75 delivers the oil-continuous liquid, usually at superatmospheric temperature, to an annular chamber of the manifold 71 from whence the liquid is distributed to the pipes 70. These pipes have perforations 76 which may face sidewardly as shown.

The perforations 32 and 76 are preferably arranged to intake and distribute larger fluid volumes at positions toward the periphery of the container 10 than adjacent the manifolds from which they extend. If equally-spaced perforations are used, they may be of progressively larger size toward the container. Alternatively, the number of perforations can be increased toward the periphery. The desideratum is to produce, between the distributor formed by the pipes 70 and the collector formed by the pipes 31, a slowly rising stream that is substantially equal in vertical component of velocity at all radial positions, this stream being successively pierced by the lowermost edges of the cylindrical electrodes 63 and 62, being thus divided into a plurality of annular streams flowing upwardly through the treating spaces 68.

It is desirable that the innermost of the cylindrical electrodes 62 be relatively small so that an insignificant portion of the rising stream will pass therethrough, particularly if no electric field is established therein. However, with the construction shown, there will be an electric field between the "live" innermost cylinder of the electrode 60 and the hanger 28 because the latter is at ground potential. Thus, even the filament of the stream nearest the axis of the container 10 will receive electric treatment in this embodiment of the invention.

As pointed out in the application of Richard W. Stenzel, Serial No. 281,541, this type of treatment is extremely effective if the amount of dispersed-phase material in the incoming oil-continuous liquid is small at the time of entry into the treating spaces 68 and if a unidirectional potential is employed to energize the upper electrode set 17. The best action will be obtained if the flow through the treating spaces 68 is substantially laminar, i. e., without substantial swirling or eddies and without substantial components of motion transverse to the direction of flow. Under such circumstances, the unidirectional electric fields will coalesce the dispersed particles into oil-dispersed masses of sufficient size to gravitate against the rising stream, these masses settling in the chamber 15 to form a body of settled material within or above the conical partition 14. A stream of this material can be withdrawn continuously or intermittently through the pipe 20.

In some instances it is desirable to employ an auxiliary electrode means in the upper chamber 15. Fig. 2 shows a horizontal auxiliary electrode 80 acting uniquely in the combination. This electrode includes a foraminous frame 81 hung by a plurality of supports 82 extending upwardly within the innermost cylinder of the electrode 60 and being connected to the frame 61. Members 83 depend from the frame 81 and support concentric rings 84 which are at the potential of the upper electrode 60. In the absence of additional structure, electric fields will be established from the lower edges of the rings 84 to the pipes 70 or to the surface of the body of settled material in the bottom of the chamber 15 if, as is usual, this material is electrically conducting. Use of the auxiliary electrode 80 is particularly desirable when a layer of sludge tends to build up just above the surface of such body of settled material. A field established to such surface will tend to resolve such sludge.

In some instances it is desirable to employ a second auxiliary electrode 85 below the electrode 80. It may be a similar concentric-ring electrode including a frame 86 mechanically and electrically connected to the container 10. When such a second auxiliary electrode 85 is used, the field from the electrode 80 effectively terminates at such second electrode.

Electrodes such as indicated at 80 and 85 have a flow-straightening action on the rising stream of oil-continuous material, tending to damp out any turbulence or horizontal components of motion in such stream. In this sence, any such electrode coacts with the upper electrode 17 in producing substantially laminar flow through the treating spaces 68.

The invention usually contemplates that at least a portion of an effluent from one of the chambers 15 and 16 shall flow through the other chamber for additional electric treatment. In the embodiment of the invention illustrated in Figs. 1 and 2, the treated oil from the chamber 15 is delivered to an ingress pipe means of the lower chamber 16, shown as a distributor 90 comprising a network of perforated pipes 91 communicating with a manifold 92 to which the treated oil is supplied from the pipe 41. The treated oil rises in the lower chamber 16 to a treating space 93 between upper and lower electrodes 94 and 95 of the lower electrode set 18. The upper electrode 94 may be constructed as above described with reference to the auxiliary electrode 80, and is shown as including a frame 96 supported from and electrically connected to the container 10 by brackets. The electrode 95 may be constructed similarly to the electrode 85, and is supported by the hanger 28.

Referring particularly to Fig. 3 which shows this support, the electrode 95 has a frame 97 suitably connected to a contact member 99 internally threaded to receive the lower end of a tubular insulator 100 extending upwardly through a central opening 101 (Fig. 2) of the upper electrode 94. The upper end of the tubular insulator 100 is connected by threads to a collar 102 which in turn is threaded to the lowermost end of the hanger 28. Correspondingly, the electrode 95 is insulated from the hanger 28 by the tubular insulator 100. The insulator is preferably made of polytetrafluoroethylene or trifluorchloroethylene. This arrangement of a tubular insulator traversing one electrode to support another is believed to be new and has been found to be very satisfactory in the structure shown. It will be recognized that the electrode 95 may be adjusted in vertical position by turning the nut 40 at the top of the container, thus permitting the operator to change the width of the treating space 93 without dismantling or draining the treater.

To energize the electrode 95, the invention employs a high-voltage cable 108, preferably a polyethylene or similar shielded cable, extending within the tubular electrode hanger 28. This high-voltage cable has a conductor 106 the lowermost end of which is in electrical engagement with the contact member 99 and thus with the electrode 95. An upper portion of the cable 108 extends through a stuffing box 109 seating against the pressure in the hanger 28.

The cable 108 extends to a high-voltage source of potential, which may be the same or a different source from that employed to energize the upper electrode set 17. With electrodes constructed like those indicated at 94 and 95, it is usually satisfactory to extend the cable 108 to a source of high-voltage alternating potential indicated at 110, typically a step-up transformer having a high-voltage secondary winding 111 with one terminal grounded and thus connected to the container 10, the other terminal being connected to the conductor of the cable 108 through the usual choke coil 112. Application of direct current to such electrodes will not substantially improve the treating action but represents an alternative which can be used if desired. However, if best results and maximum removal of dispersed-phase material are desired by use of electrodes of the type constituting the electrode set 17, they should be connected to a source of high unidirectional potential such as suggested at 113 as including a step-up transformer feeding a bridge rectifier 114 having one output terminal connected to the container through ground and having its other output terminal connected with the conductor of the cable 58. A choke coil 115 is preferably connected between the transformer and the bridge rectifier. Applied to electrodes of the type present in the electrode set 17, the unidirectional potential gives surprisingly improved results as compared with use of alternating potential of substantially the same rated voltage.

On the other hand, greater simplicity and unique coactions result from connecting each of the electrode sets 17 and 18 to the same source of unidirectional potential. In this way, changing conditions in the treating spaces of one electrode set are reflected in the other, the choke coil simultaneously changing the potentials applied to the electrode sets in a related way, depending on the current through the choke coil. Furthermore, the capacitance of the second electrode set acts additionally to filter the pulsations from the rectifier 114. Also, costs and operating difficulties are reduced by use of a single potential source energizing both electrode sets.

The electric field in the treating space 93 coalesces the dispersed-phase material associated with a treated oil. The coalesced masses gravitate to the lower portion of the chamber 16 and are withdrawn through an egress pipe means shown as including a pipe 116, usually equipped with a valve 117, which may be controlled manually or automatically in response to changing interfacial levels in the chamber 16 or change in the amount of settled material therein.

The remaining or further-treated oil rises in the lower chamber 16 and is withdrawn through an egress pipe means shown as including a collector 120 formed of a network of perforated pipes 121 secured to the partition 14 as by straps 122 and feeding a manifold 123. This manifold is of a double-walled construction having a central passage 124 slidably receiving the hanger 28. The additionally-treated oil enters a manifold space 125 and flows therefrom through a pipe 126, preferably equipped with a valve 127. The pipes 121 preferably extend below and parallel to the partition 14 with their inner portions inclined downwardly to the manifold 123.

The first electric treatment of the oil-continuous liquid can be effected either in the upper chamber 15 or the lower chamber 16, the electrode sets 17 and 18 being as shown or being reversed. It is preferable, however, to perform in the upper chamber 15 any treatment involving the use of unidirectional fields between interspaced, concentric electrodes especially where such treatment involves the resolution of emulsions or dispersions made by mixing acids or alkalies with an oil, which systems pose problems of providing adequate electrical insulation. This permits the housings 44 for the insulators 48 to be positioned above the main portion of the container 10 and permits placing the insulators in pockets which can be filled with dielectric oil or inert gas to avoid contacting the insulators with the oil-continuous liquid being treated. Additionally, it is often desirable to apply a coating of heat-insulating material to that portion of the container 10 surrounding the zone of unidirectional-current treatment to prevent differential temperatures conducive to thermal circulations. Some advantages arise in this connection from placing the unidirectional-current electrodes in the upper chamber 15. The partition 14 serves a desirable function in this regard because it saves the expense of applying heat-insulating material to the lowermost wall of the chamber 15. In this connection, the temperature in the chambers 15 and 16 is approximately the same wherefore there is no tendency for localized cooling of the contents of the chamber 15 by heat transfer through the lowermost wall thereof.

In Fig. 1, the apparatus is illustrated as applied to the caustic treatment of a heavy gasoline. A stream of the gasoline is pumped into the pipe 75 by a pump 150 through a mixer 151. A pump 152 feeds a stream of aqueous alkali solution to the mixer 151 through a pipe 153. The resulting dispersion or emulsion is electrically treated by the unidirectional fields in the treating spaces 68 (Fig. 2). The dispersed-phase material here constitutes alkaline reaction products dispersed as minute droplets throughout the gasoline. A high percentage of these droplets will be coalesced by the unidirectional fields, the coalesced masses settling to a body of aqueous material in the bottom of the chamber 15 from which this material may be withdrawn through the pipe 20.

The treated gasoline, now containing only a small fraction of such reaction products, is removed continuously through the pipe 41. A pump 155 may be used to pump into the pipe 41 a stream of water to produce a gasoline-continuous dispersion or emulsion at or beyond the point of junction of the streams. If desired, the water and gasoline may be further mixed by passage through a mixer 156, particularly if a pump 157 is disposed in the pipe 41 to increase the pressure on the gasoline stream. The resulting emulsion or dispersion is distributed in the lower chamber 16 and is treated in the treating space 93. It will be found that most of the water added through the pump 155 and much of the residual alkalinity or reaction products will settle in the chamber 16 as an aqueous body from which liquid can be withdrawn through the pipe 116. The further-treated or purified oil rises in the chamber 16 and is withdrawn through the pipe 126.

In such a process, desirable results have been produced by mixing with the gasoline about 1 volume percent of 40° Bé. caustic. About 5% of fresh water can be mixed with the treated gasoline flowing in the pipe 41. The gasoline discharging through the pipe 126 will be found to be stable and to contain only about .001% of residual dispersed-phase material, which largely settles therefrom on standing in storage.

It will be understood, however, that the apparatus of the present invention can be used in the practice of numerous processes and is not limited to the gasoline-treating process exemplified.

I claim as my invention:

1. In an electric treater for processing oil-continuous dispersions to resolve same and separate the constituents thereof, the combination of: an upright cylindrical container of a height several times its diameter closed at its upper and lower ends; a partition dividing the interior of said container into upper and lower chambers, said partition comprising a metal cone with apex downward separating said upper and lower chambers; an electrode set in each of said chambers, each electrode set including a high-voltage electrode and means for insulating same from said container; means for energizing said high-voltage electrode of each electrode set to establish a high-voltage field in each chamber; means for delivering the oil-continuous dispersion to be treated to said upper chamber, said dispersion being acted on by the high-voltage field therein in a manner adapted to produce treated constituents gravitationally separating in said upper chamber to form superimposed bodies of treated oil-continuous liquid and a heavier settled liquid; means including a pipe communicating with the lower interior of said upper chamber near said apex and extending to a position exterior of said container for withdrawing said heavier settled liquid from the body thereof; means for withdrawing treated oil-continuous liquid from the body thereof; means for delivering the withdrawn treated oil-continuous liquid to said lower chamber, the latter liquid being acted upon by the high-voltage field in said lower chamber to produce a further treated liquid collecting as a body in said lower chamber, said metal cone tending to equalize the temperatures in said upper and lower chambers by transmitting heat between said heavier settled liquid and said further treated liquid; and means for withdrawing said further treated liquid from said body thereof.

2. An electric treater for the dual electric treatment of oil-continuous liquids, said treater including in combination: an upright elongated container closed at its ends and much greater in height than width; two electrode sets respectively in upper and lower chamber portions of said container, each electrode set including a treating space, each of said chamber portions having upper and lower zones respectively adapted to contain an upper oil-continuous liquid body and a lower liquid body; means for energizing said electrode sets to establish electric fields in said treating spaces; a heat-conducting partition separating said chamber portions and transferring heat between a lower liquid body in the upper chamber portion and an upper liquid body in the other lower chamber portion; means for introducing the oil-continuous liquid to be treated into a first of said chamber portions for treatment by the electric field therein, the treated liquid having components respectively joining the liquid bodies in such first chamber portion; an orificed distributor within the second of said chamber portions including an influent pipe extending from the exterior of said container to said orificed distributor; an orificed outlet means opening on the upper zone of said first chamber portion and the oil-continuous liquid body therein, said outlet means including an effluent pipe extending to the exterior of said container; a connecting pipe outside said container joining said influent and effluent pipes and conducting a stream of the oil-continuous liquid from the upper zone of the first chamber portion through said effluent pipe to said influent pipe and orificed distributor and thence into the remaining chamber portion for treatment in the treating space thereof, the components of the thus-treated liquid joining the upper and lower liquid bodies in said remaining chamber portion; and means for separately removing liquid from the upper and lower zones of such remaining chamber portion to the exterior of said container.

3. An electric treater for the dual electric treatment of oil-continuous liquids, said treater including in combination: an upright container much greater in height than width; upper and lower heads respectively closing the upper and lower ends of said container; an impervious partition electrically connected to said container and dividing the interior of said container into upper and lower chambers, said partition having an opening; an electrode hanger extending through said opening in substantially fluid-tight relationship, said hanger having upper and lower portions respectively above and below said partition; means for supporting said upper portion of said hanger and for electrically connecting said hanger to said container; an insulator in said lower chamber suspended by said lower portion of said hanger; an electrode in said lower chamber supported by said insulator; electrode means in said upper chamber; means for energizing said electrode and said electrode means; ingress and egress pipe means communicating with each of said chambers and including means for delivering the oil-continuous liquid to be treated to one of said chambers; and means for conducting liquid from the egress pipe means of such one chamber to the ingress pipe means of the other chamber.

4. An electric treater as defined in claim 3 in which there is an annular space in said upper chamber between said container and said upper portion of said hanger, and in which said electrode means in said upper chamber includes two interspaced sets of concentric cylindrical electrodes in said annular space concentric with said hanger, the cylindrical electrodes of one set bisecting the spaces between the cylindrical electrodes of the other set to form therewith annular treating spaces open at their upper and lower ends, one of said electrode sets providing a central opening through which said upper portion of said hanger extends.

5. An electric treater as defined in claim 3 including a gland structure supported from said partition slidably receiving said hanger, and means for moving said upper portion of said hanger to slide the latter within said gland structure to adjust the position of said electrode in said lower chamber.

6. An electric treater for the dual electric treatment of oil-continuous liquids, said treater including in combination: an upright container much greater in height than width; upper and lower heads respectively closing the upper and lower ends of said container; an impervious partition dividing the interior of said container into upper and lower chambers, said partition having an opening; an electrode hanger extending through said opening, in substantially fluid-tight relationship, said hanger comprising a pipe having upper and lower portions respectively above and below said partition; means for supporting said upper portion of said pipe, said upper portion extending to a position outside said container; a high-voltage cable extending downward in said pipe to said lower chamber; an electrode in said lower chamber electrically connected to and energized by said high-voltage cable; electrode means in said upper chamber; two sources of high-voltage potential and means for respectively connecting same to said electrode means and through said high-voltage cable to said electrode in said lower chamber; ingress and egress pipe means communicating with each of said chambers and including means for delivering the oil-continuous liquid to be treated to one of said chambers; and means for conducting liquid from the egress pipe means of such one chamber to the ingress pipe means of the other chamber.

7. An electric treater for the dual electric treatment of oil-continuous liquids, said treater including in combination: an upright container much greater in height than width; upper and lower heads respectively closing the upper and lower ends of said container; a partition dividing the interior of said container into upper and lower chambers, said partition having an opening; an electrode hanger extending through said opening in substantially fluid-tight relationship, said hanger comprising a pipe having upper and lower portions respectively above and below said partition; means for supporting said upper portion; an electrode in said lower chamber connected to said lower portion, said lower portion including a tubular insulator mechanically connected to said electrode; electrode means in said upper chamber; means for energizing said electrode and said electrode means, said means for energizing said electrode including a high-voltage cable extending downward in said pipe and through said tubular insulator, said cable providing a lower end electrically connected to said electrode; ingress and egress pipe means communicating with each of said chambers and including means for delivering the oil-continuous liquid to be treated to one of said chambers; and means for conducting liquid from the egress pipe means of such one chamber to the ingress pipe means of the other chamber.

8. An electric treater for the dual electric treatment of oil-continuous liquids, said treater including in combination: an upright container much greater in height than width; upper and lower heads respectively closing the upper and lower ends of said container; a partition dividing the interior of said container into upper and lower chambers, said partition having an opening; an upstanding pipe secured in said opening and extending into said upper chamber substantially axially of said container, there being an annular space between the container and the upright pipe; electrode means comprising electrode sets in said upper and lower chambers for establishing electric fields respectively in said chambers, said partition electrically shielding said electrode sets from each other; and ingress and egress pipe means communicating with each of said chambers, the ingress pipe means for said upper chamber comprising a perforated pipe distributor in said annular space comprising a manifold surrounding a portion of said upstanding pipe and perforated pipes communicating interiorly with said manifold and extending therefrom into said annular space.

9. An electric treater for the dual electric treatment of oil-continuous liquids, said treater including in combination: an upright container much greater in height than width; upper and lower heads respectively closing the upper and lower ends of said container; a partition dividing the interior of said container into upper and lower chambers, said partition having an opening; an upstanding pipe secured in said opening and extending into said upper chamber substantially axially of said container; electrode means comprising electrode sets in said upper and lower chambers for establishing electric fields respectively in said chambers, said partition electrically shielding the electrode sets from each other; an electrode hanger extending downwardly through said upstanding pipe to said lower chamber; means for sealing the junction of said hanger and said upper portion of said upstanding pipe; means for mechanically connecting a portion of the electrode means in said lower chamber to said hanger; and ingress and egress pipe means communicating with each of said chambers, the ingress means for said upper chamber comprising a perforated pipe distributor surrounding a portion of said upstanding pipe.

10. In an electric treater the combination of: a container providing a chamber; an upper substantially horizontal electrode having a central opening; means for supporting said upper electrode in said chamber; a lower electrode having a central portion; a tubular insulator extending vertically through said central opening of said upper electrode from a position above said upper electrode to a position therebelow; means for connecting said central portion of said lower electrode to the lower end of said insulator; means electrically connected to said container and attached to the upper end of said insulator thereby supporting same and said lower electrode; and conductor means extending interiorly of said tubular insulator and connected to said lower electrode for applying a high voltage thereto.

11. In an electric treater for processing oil-continuous dispersions to resolve same and separate the constituents thereof, the combination of: an upright cylindrical container of a height several times its diameter closed at its upper and lower ends; a metal partition dividing the interior of said container into upper and lower chambers, said partition sloping to provide a lower position within said upper chamber; an electrode set in each of said chambers, each electrode set including two electrodes each spaced from said metal partition, one of said electrodes of each set being a high-voltage electrode; means for insulating the high voltage electrode of each set from said container and from the high-voltage electrode of the other set; first and second sources of high-voltage potential and means for respectively connecting same to said high-voltage electrodes of said sets to establish a high-voltage field in each chamber between the two electrodes of the set therein; means for delivering the oil-continuous dispersion to be treated to one of said chambers, said dispersion being acted on by the high-voltage field therein in a manner to produce treated constituents gravitationally separating in said one chamber to form superimposed bodies of treated oil-continuous liquid and a heavier settled liquid; means for withdrawing treated oil-continuous liquid from the body thereof to a position outside said container; means for delivering the withdrawn treated oil-continuous liquid from said position outside said container to the other of said chambers, the latter liquid being acted on by the high-voltage field therein to produce treated constituents gravitationally separating in said other chamber to form superimposed bodies of further treated oil-continuous liquid and a further heavier settled liquid, said metal partition separating and tending to equalize the temperatures of the bodies of settled liquid and treated oil-continuous liquid in said upper and lower chambers; means including a pipe communicating with said lower position of said upper chamber and extending to a position exterior of said container for withdrawing the settled liquid from the body thereof in said upper chamber; means for withdrawing settled liquid from the lower interior of said lower chamber; and means for withdrawing the further treated oil-continuous liquid from the body thereof in the other of said chambers.

12. An electric treater for the sequential electric treatment of oil-continuous liquids, said treater including in combination: an upright cylindrical container much greater in height than diameter; upper and lower heads respectively closing the upper and lower ends of said container; a downwardly dished partition dividing the interior of said container into upper and lower chambers; electrode means in each of said chambers for establishing electric fields respectively therein; ingress and egress pipe means communicating with each of said chambers and including means for delivering the oil-continuous liquid to be treated to a first of said chambers; and means for withdrawing liquid from this chamber through its egress means and delivering at least a portion thereof to the ingress pipe means of the remaining chamber, the egress pipe means for said lower chamber including a pipe network immediately below and substantially conforming to the contour of said partition.

13. An electric treater for the sequential electric treatment of oil-continuous liquids, said treater including in combination: an upright cylindrical container much greater in height than diameter; upper and lower heads respectively closing the upper and lower ends of said container; a downwardly dished partition dividing the interior of said container into upper and lower chambers; electrode means in each of said chambers for establishing electric fields respectively therein; ingress and egress pipe means communicating with each of said chambers and including means for delivering the oil-continuous liquid to be treated to a first of said chambers; and means for withdrawing liquid from this chamber through its egress means and delivering at least a portion thereof to the ingress pipe means of the remaining chamber, the egress pipe means of one of said chambers including a perforated pipe network in the upper end of such chamber concentric with the axis of said container, the ingress means in such one chamber comprising a distributor in the lower portion thereof concentric with said axis, said distributor providing a plurality of openings discharging liquid at a plurality of positions, said liquid rising in such one chamber as a container-filling column, the electrode means in such one chamber including interspaced sets of concentric cylindrical electrodes extending substantially horizontally thereacross to divide the horizontal cross-sectional area of such one chamber into a plurality of annular treating spaces through which rises the liquid from said distributor, said concentric electrodes being concentric with said axis.

14. An electric treater for the dual electric treatment of oil-continuous liquids, said treater including in combination: an upright elongated container closed at its ends and much greater in height than width; two electrode sets respectively in upper and lower chamber portions of said container, each electrode set including a treating space, each of said chamber portions having upper and lower zones respectively adapted to contain an upper oil-continuous liquid body and a lower liquid body; means for energizing said electrode sets to establish electric fields in said treating spaces; a heat-conducting partition separating said chamber portions and transferring heat between a lower liquid body in the upper chamber portion and an upper liquid body in the lower chamber portion; means for introducing the oil-continuous liquid to be treated into a first of said chamber portions for treatment by the electric field therein, the treated liquid having components respectively joining the liquid bodies in such first chamber portion; pipe means for conducting a stream of the oil-continuous liquid from the upper zone of the first chamber portion to a position outside said container and thence into the remaining chamber portion for treatment in the treating space thereof, the components of the thus-treated liquid joining the upper and lower liquid bodies in said remaining chamber portion; means for removing liquid from the upper and lower zones of such remaining chamber portion; and means for adding to and mixing with the liquid flowing through said pipe means another liquid modifying the oil-continuous material flowing to said remaining chamber portion for treatment therein.

15. An electric treater as defined in claim 14 in which said means for adding and mixing said other liquid includes a side pipe communicating with said pipe means at a junction outside said container, a pump connected in said side pipe for forcing said other liquid through said side pipe to said junction, and mixing means adjacent said junction for mixing the liquids entering said junction.

16. An electric treater as defined in claim 15 including a pump connected in said pipe means at a position outside said container and ahead of said junction, said pumps respectively pressuring a stream of the oil-continuous liquid from said first chamber portion and a stream of said other liquid.

References Cited in the file of this patent

UNITED STATES PATENTS

| | | |
|---|---|---|
| 987,115 | Cottrell | Mar. 21, 1911 |
| 1,591,472 | DeBrey | July 6, 1926 |
| 1,838,977 | Worthington | Dec. 29, 1931 |
| 2,027,615 | Prutzman | Jan. 14, 1936 |
| 2,041,954 | Prutzman | May 26, 1936 |
| 2,072,918 | Woelflin | Mar. 9, 1937 |
| 2,417,637 | Eddy | Mar. 18, 1947 |

FOREIGN PATENTS

| | | |
|---|---|---|
| 1,059,804 | France | Nov. 18, 1953 |